US012590185B2

(12) United States Patent
Suter

(10) Patent No.: US 12,590,185 B2
(45) Date of Patent: Mar. 31, 2026

(54) RAPID-CURING TWO-COMPONENT SILICONE COMPOSITION HAVING A LONGER MIXER OPEN TIME

(71) Applicant: SIKA TECHNOLOGY AG, Baar (CH)

(72) Inventor: Riccardo Suter, Baden (CH)

(73) Assignee: SIKA TECHNOLOGY AG, Baar (CH)

( * ) Notice: Subject to any disclaimer, the term of this patent is extended or adjusted under 35 U.S.C. 154(b) by 522 days.

(21) Appl. No.: 18/026,158

(22) PCT Filed: Nov. 29, 2021

(86) PCT No.: PCT/EP2021/083406
§ 371 (c)(1),
(2) Date: Mar. 14, 2023

(87) PCT Pub. No.: WO2022/117513
PCT Pub. Date: Jun. 9, 2022

(65) Prior Publication Data

US 2023/0357510 A1 Nov. 9, 2023

(30) Foreign Application Priority Data

Dec. 2, 2020 (EP) .................................... 20211309

(51) Int. Cl.
*C08L 83/04* (2006.01)
*C08G 77/08* (2006.01)
*C08G 77/18* (2006.01)

(52) U.S. Cl.
CPC ............. *C08G 77/08* (2013.01); *C08G 77/18* (2013.01); *C08G 2150/00* (2013.01); *C08G 2170/00* (2013.01); *C08G 2190/00* (2013.01)

(58) Field of Classification Search
CPC ....................................................... C08L 83/04
USPC ............................................... 528/17, 18, 34
See application file for complete search history.

(56) References Cited

U.S. PATENT DOCUMENTS 4,962,152 A 10/1990 Leempoel
5,346,940 A * 9/1994 Brassard .............. C08K 5/5415 524/789
11,711,135 B1 * 7/2023 Gajjar .................... H04B 7/155 370/316
2003/0051610 A1 3/2003 Dux et al.
2006/0155045 A1 7/2006 Tsuno et al.
2020/0157395 A1 * 5/2020 Liu ....................... B32B 27/281

FOREIGN PATENT DOCUMENTS

EP 0787766 A1 8/1997
EP 1995281 A1 11/2008
WO 2007/096355 A1 8/2007

OTHER PUBLICATIONS

Mar. 2, 2022 International Search Report issued in International Patent Application No. PCT/EP2021/083406.
May 30, 2023 International Preliminary Report on Patentability issued in International Patent Application No. PCT/EP2021/083406.

* cited by examiner

*Primary Examiner* — Margaret G Moore
(74) *Attorney, Agent, or Firm* — Oliff PLC

(57) ABSTRACT

A two-component silicone composition including a component (A) including at least one hydroxyl-terminated polydiorganosiloxane (P); preferably at least one filler; between 0.05% and 5.0% by weight of emulsified water, based on component (A); and a component (B) including at least one noncondensable polydiorganosiloxane (W) as a plasticizer; at least one organosilane (V) as a crosslinker; at least one catalyst (K) for the crosslinking of polydiorganosiloxanes; wherein all organosilanes (V) preferably have the same hydrolyzable alkoxysilane groups, preferably methoxysilane groups; and catalyst (K) is a tin complex having two mercaptide ligands of formula (V), where ligands ($L^1$) are each independently alkyl mercaptides coordinated via sulfur, especially $C_6$ to $C_{16}$ alkyl mercaptides, where ligands ($L^1$) optionally have methyldialkoxysilane groups, preferably methyldimethoxysilane groups, and ligands ($L^2$) are each independently alkyl ligands, especially $C_6$ to $C_{14}$ alkyl ligands; and component (B) contains less than 5% by weight of carbon black based on component (B).

14 Claims, No Drawings

RAPID-CURING TWO-COMPONENT SILICONE COMPOSITION HAVING A LONGER MIXER OPEN TIME

TECHNICAL FIELD

The present invention relates to the field of two-component silicone compositions.

PRIOR ART

Two-component silicone compositions have already long been known and are used particularly as adhesives and sealants in various applications. Products in widespread use are in particular two-component silicone compositions that crosslink at room temperature, also known as RTV-2 silicones (RTV-2: "room temperature vulcanizing, 2-part silicones").

Such a two-component silicone composition is described for example in EP 0 787 766 A1. In order not to decrease the storage stability of the composition described therein, or to prevent premature unwanted curing, the main constituents, namely an α,ω-dihydroxypolydiorganosiloxane and a catalyst and a crosslinker for the crosslinking of polydiorganosiloxanes, are stored in two separate components. In the application of such a composition, the two components are then mixed together in an intended weight ratio or volume ratio, which is important for crosslinking or for curing of the composition. The time during which the mixture can still be processed and applied before curing has advanced too far is referred to as pot life or open time.

A major drawback of such two-component silicone compositions as described in EP 0 787 766 A1 is the interdependence of the pot life and the rate of curing. These properties are determined by the formulation of the two-component silicone composition, but in particular via the type and amount of reactive substances present, such as crosslinkers, and via the amount of catalyst. It is typically possible here to achieve two-component silicone compositions having short pot life and rapid curing, or else long pot life and slow curing. All these compositions moreover have typical curing characteristics associated with crosslinking that is slow or rapid, but constant from the start, and hence with an increase in viscosity after mixing of the components. This is a problem in industrial manufacture in particular. What would be desirable there would be a pot life tailored to the process without waiting periods, but then with very rapid curing of the composition after application, in order that the components produced can be moved onward swiftly. In the case of very short pot lives, another problem is that the mixture begins to cure too early and hence gives rise to rejects and undesirable cleaning operations. In the case of excessively long pot lives followed by slow curing, the cycle times in manufacturing are increased by waiting periods, which is likewise undesirable. An ideal two-component silicone composition would therefore have a long pot life but then cure very quickly. This can however be achieved only with difficulty. Another major drawback of fast-curing two-component silicone compositions is what is known as the mixer open-time problem. This occurs primarily when the two components are mixed together using a static mixer or the like. What happens is that when the two components encounter one another on entering the static mixer, there can be a brief local overconcentration of the catalyst-containing component relative to the polydiorganosiloxane-containing component that results in rapid curing of the composition inside the static mixer, which can clog the mixer or can shorten the pot life considerably during and after application. This is a particular problem when the polydiorganosiloxane-containing component is used in a weight ratio of 1:1 relative to the catalyst-containing component, which is often the case in practice.

Options for remedying this drawback include, for example, decreasing the catalyst concentration in the catalyst-containing component, either by actually decreasing the catalyst content or else by diluting the catalyst more. However, decreasing the catalyst content inevitably results in an increase in the curing time, i.e. also in the pot life, which is usually undesirable. On the other hand, higher dilution of the catalyst means that additional diluents need to be used or nonreactive constituents need to be transferred from the polydiorganosiloxane-containing component to the catalyst-containing component, which can be accompanied by poorer processability and/or poorer mechanics in the cured composition and also restricts the configurational options of the composition.

There is therefore the need for a two-component silicone composition that has a long pot life and at the same time a long mixer open time, i.e. is less susceptible to unfavorable mixing phenomena described above, but cures very quickly after the end of the pot life, in order that the manufacturing components with the composition applied can be moved onward as swiftly as possible.

SUMMARY OF THE INVENTION

The object of the present invention is therefore to provide a two-component silicone composition that overcomes the drawbacks of the prior art and that has a long mixer open time irrespective of the mixing ratio and a long pot life, and that cures very quickly after the end of the pot life. In addition, the composition should be able to be formulated with low crosslinker concentrations and thus have low levels of VOC contamination from eliminated alcohols, be unusually storage-stable, and have good mechanical properties after curing.

It has been found that, surprisingly, this object is achieved by two-component silicone compositions as claimed in claim 1.

By using a specific catalyst having two thiolate ligands, which is in no way obvious to the person skilled in the art, preferably in combination with specific organosilanes as crosslinkers, it is possible to provide two-component silicone compositions that have a long pot life and, above all, a long mixer open time and that can be used in broadly definable mixing ratios of the two components. The two-component silicone compositions according to the invention have a robust mixing profile, i.e. they can be used with broadly selectable mixing ratios of polymer component to curing component. In addition, the two-component silicone compositions according to the invention have unusually good storage stability, especially in respect of the curing component containing the catalyst. This shows an unusually low tendency to phase separation and can therefore be used without restrictions even after a long period of storage. The two-component silicone compositions according to the invention can be adjusted such that it is possible to achieve pot lives of, for example, 25 min and at the same time mixer open times of, for example, 7-8 minutes. At the same time, the two-component silicone compositions according to the invention cure with sufficient rapidity that, in preferred embodiments, the mixtures are 80% cured 4 h after the end of application, with a pot life of up to 30 minutes. The two-component silicone compositions according to the invention also exhibit very good adhesion to various substrates.

Further aspects of the invention are the subject of further independent claims. Particularly preferred embodiments of the invention are the subject of the dependent claims.

Ways of Executing the Invention

The present invention provides a two-component silicone composition consisting of a component A comprising i) at least one hydroxyl-terminated polydiorganosiloxane P;

ii) preferably at least one filler;

iii) between 0.05% and 5.0% by weight of emulsified water, based on component A;

and a component B comprising i) at least one noncondensable polydiorganosiloxane W as plasticizer;

ii) at least one organosilane V as crosslinker;

iii) at least one catalyst K for the crosslinking of polydiorganosiloxanes;

characterized in that all organosilanes V preferably have the same hydrolyzable alkoxysilane groups, preferably methoxysilane groups; and catalyst K is a tin complex of formula (V) that has two mercaptide ligands, (V)

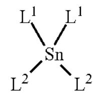

where ligands $L^1$ are each independently alkyl mercaptides coordinated via sulfur, especially $C_6$ to $C_{16}$ alkyl mercaptides, where ligands optionally have methyldialkoxysilane groups, preferably methyldimethoxysilane groups, and ligands $L^2$ are each independently alkyl ligands, especially $C_6$ to $C_{14}$ alkyl ligands; and component B contains less than 5% by weight of carbon black, based on component B.

In the present document, the term "silane group" refers to a silyl group that is bonded to an organic radical or to a polyorganosiloxane radical and has one to three, especially two or three, hydrolyzable substituents on the silicon atom. Particularly common hydrolyzable substituents are alkoxy radicals. These silane groups are also referred to as "alkoxysilane groups". Silane groups may also be in partly or fully hydrolyzed form.

"Aminosilane" and "glycidoxysilane" refer to organoalkoxysilanes having respectively one or more amino or glycidoxy groups on the organic radical in addition to the silane group.

"Primary amino group" and "primary amine nitrogen" refer respectively to an $NH_2$ group and the nitrogen atom thereof that is bonded to an organic radical, and "secondary amino group" and "secondary amine nitrogen" refer respectively to an NH group and the nitrogen atom thereof that is bonded to two organic radicals, which may also together be part of a ring, and "tertiary amino group" and "tertiary amine nitrogen" refer respectively to an N group and the nitrogen atom thereof that is bonded to three organic radicals, two or three of which together may also be part of one or more rings.

The term "organic polymer" encompasses a collective of macromolecules that are chemically homogeneous, but differ in their degree of polymerization, molar mass, and chain length, which has been produced by a poly reaction (polymerization, polyaddition, polycondensation) and has a majority of carbon atoms in the polymer backbone, and also reaction products of such a collective of macromolecules. Polymers having a polyorganosiloxane backbone (commonly referred to as "silicones") are not organic polymers in the context of the present document.

"Molecular weight" in the present document is understood as meaning the molar mass (in grams per mole) of a molecule or part of a molecule, also referred to as a "radical". "Average molecular weight" denotes the number-average $M_n$ of an oligomeric or polymeric mixture of molecules or radicals, which is typically determined by gel-permeation chromatography (GPC) against polystyrene as standard.

A substance or a composition is described as "storage-stable" or "storable" if it can be stored at room temperature in a suitable container over a prolonged period, typically for at least 6 months up to 9 months and more, without the storage resulting in any change in its application properties or use properties, particularly in the viscosity and the crosslinking rate, to an extent relevant to the use thereof.

In the present document, substance names beginning with "poly", for example polyol, refer to substances formally containing two or more of the eponymous functional groups per molecule.

The term "polymer" in the present document encompasses firstly a collective of macromolecules that are chemically uniform, but differ in their degree of polymerization, molar mass, and chain length, said collective having been prepared by a poly reaction (polymerization, polyaddition, polycondensation). The term also secondly encompasses derivatives of such a collective of macromolecules from poly reactions, i.e. compounds which were obtained by reactions, for example additions or substitutions, of functional groups in defined macromolecules and which may be chemically uniform or chemically nonuniform. The term further encompasses so-called prepolymers too, i.e. reactive oligomeric initial adducts, the functional groups of which are involved in the formation of macromolecules.

The term "pot life" or its synonym "open time" is understood as meaning the window of processability of reactive compositions after application thereof. The end of the pot life is in most cases associated with a rise in viscosity of the composition such that no further useful processing of the composition is possible.

The term "mixer open time" is understood as meaning the open time, i.e. the processing time, of a reactive composition inside a static mixer. During this time, the material can remain in the mixer without significant changes in its processing characteristics and without the need for purging or product extrusion in order to continue the operation.

A dashed line in the formulas in this document in each case represents the bond between a substituent and the associated molecular radical.

"Room temperature" refers to a temperature of approx. 23° C. Unless otherwise stated, all industrial standards or standards mentioned in the document relate to the version of the industrial standard or the standard that was valid at the time of filing of the patent application.

The terms "mass" and "weight" are used synonymously in this document. Thus a "percentage by weight" (% by weight) is a percentage mass fraction which unless otherwise stated relates to the mass (the weight) of the total composition or, depending on the context, of the entire molecule.

Component A

The first component A of the two-component silicone composition contains at least one hydroxyl-terminated polydiorganosiloxane P and between 0.05% and 5.0% by weight of emulsified water, based on component A, and also preferably at least one filler.

Polydiorganosiloxane P

Component A of the two-component silicone composition comprises the hydroxyl-terminated polydiorganosiloxane P, which is especially a polydiorganosiloxane P' of the formula (IV).

(IV)

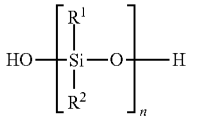

The radicals $R^1$ and $R^2$ are here each independently linear or branched, monovalent hydrocarbyl radicals that have 1 to 12 carbon atoms and optionally include one or more heteroatoms, and optionally one or more C—C multiple bonds and/or optionally cycloaliphatic and/or aromatic components.

In particular, the radicals $R^1$ and $R^2$ are alkyl radicals having 1 to 5, especially having 1 to 3, carbon atoms, preferably methyl groups.

The index n is chosen such that the weight-average molecular weight $M_w$ of the polydiorganosiloxane P relative to polystyrene is 500 to 250000 g/mol.

More particularly, the hydroxyl-terminated polydiorganosiloxane P' is a polydiorganosiloxane P1 of the formula (I), where n is chosen such that the weight-average molecular weight $M_w$ of the polydiorganosiloxane P1 relative to polystyrene is 30000 to 80000 g/mol, especially 35000 to 60000 g/mol, or that the polydiorganosiloxane P' used is a mixture of

- i') at least one hydroxyl-terminated polydiorganosiloxane P2 of the formula (I), where n is chosen such that the weight-average molecular weight $M_w$ of the polydiorganosiloxane P2 relative to polystyrene is >80000 to 250000 g/mol, especially 90000 to 150000 g/mol; and
- ii') at least one hydroxyl-terminated polydiorganosiloxane P3 of the formula (I), where n is chosen such that the weight-average molecular weight $M_w$ of the polydiorganosiloxane P3 relative to polystyrene is 500 to ≤30000 g/mol, especially 500 to 25000 g/mol, preferably 1000 to 20000 g/mol;

or that the polydiorganosiloxane P' used is a mixture of

- i") at least one hydroxyl-terminated polydiorganosiloxane P1 of the formula (I), where n is chosen such that the weight-average molecular weight $M_w$ of the polydiorganosiloxane P1 relative to polystyrene is 30000 to 80000 g/mol, especially 35000 to 60000 g/mol; and
- ii") at least one hydroxyl-terminated polydiorganosiloxane P3 of the formula (I), where n is chosen such that the weight-average molecular weight $M_w$ of the polydiorganosiloxane P3 relative to polystyrene is 500 to ≤30000 g/mol, especially 500 to 25000 g/mol, preferably 1000 to 20000 g/mol.

Hydroxyl-terminated polydiorganosiloxanes, especially those represented by formula (I), are known and commercially available. Polydiorganosiloxanes of this kind are also prepared in a known manner. For example, their preparation is described in U.S. Pat. No. 4,962,152, the disclosure of which is hereby incorporated by reference.

The above-described hydroxyl-terminated polydiorganosiloxanes P preferably have a viscosity at 23° C. of between 1 and 500000 mPa·s, especially between 10 and 250000 mPa·s.

Further preferably, the polydiorganosiloxane P1 has a viscosity at 23° C. of between 5000 and 100000 mPa·s, especially between 7500 and 50000 mPa·s.

If the polydiorganosiloxane P' is a mixture of at least one hydroxyl-terminated polydiorganosiloxane P2 and at least one hydroxyl-terminated polydiorganosiloxane P3, the polydiorganosiloxane P2 preferably has a viscosity at 23° C. of between 100000 and 500000 mPa·s, especially between 150000 and 250000 mPa·s, and the polydiorganosiloxane P3 preferably has a viscosity at 23° C. of between 1 and 5000 mPa·s, especially between 10 and 2500 mPa·s, preferably between 20 and 1000 mPa·s.

The stated viscosities are measured in accordance with DIN 53018.

It may be advantageous to use a plurality of different polydiorganosiloxanes P2 and/or P3 in the form of a mixture.

If the polydiorganosiloxane P' is a mixture of at least one hydroxyl-terminated polydiorganosiloxane P1 and at least one hydroxyl-terminated polydiorganosiloxane P3, the polydiorganosiloxane P1 preferably has a viscosity at 23° C. of between 100000 and 500000 mPa·s, especially between 7500 and 50000 mPa·s, and the polydiorganosiloxane P3 preferably has a viscosity at 23° C. of between 1 and 5000 mPa·s, especially between 10 and 2500 mPa·s, preferably between 20 and 1000 mPa·s.

The stated viscosities are measured in accordance with DIN 53018.

It may be advantageous to use a plurality of different polydiorganosiloxanes P1 and/or P3 in the form of a mixture.

If the polydiorganosiloxane P' used is a mixture of at least one polydiorganosiloxane P2 and at least one polydiorganosiloxane P3, the proportion by weight of polydiorganosiloxane P2 is generally above the proportion by weight of polydiorganosiloxane P3. However, it should be taken into account that the respective proportions are dependent on the molecular weight of the respective polydiorganosiloxanes.

If the polydiorganosiloxane P' used is a mixture of at least one polydiorganosiloxane P1 and at least one polydiorganosiloxane P3, the proportion by weight of polydiorganosiloxane P1 is generally above the proportion by weight of polydiorganosiloxane P3. However, it should be taken into account that the respective proportions are dependent on the molecular weight of the respective polydiorganosiloxanes.

Component A contains the hydroxyl-terminated polydiorganosiloxane P or the hydroxyl-terminated polydiorganosiloxane P' preferably in an amount of between 30% by weight and 70% by weight, preferably between 30% by weight and 50% by weight, based on component A.

If the polydiorganosiloxane P' is a mixture of at least one hydroxyl-terminated polydiorganosiloxane P2 and at least one hydroxyl-terminated polydiorganosiloxane P3, component A preferably contains between 20% by weight and 60% by weight, preferably between 30% by weight and 50% by weight, based on component A, of hydroxyl-terminated polydiorganosiloxane P2, and between 1% by weight and 15% by weight, preferably between 2% by weight and 10% by weight, based on component A, of hydroxyl-terminated polydiorganosiloxane P3.

If the polydiorganosiloxane P' is a mixture of at least one hydroxyl-terminated polydiorganosiloxane P1 and at least one hydroxyl-terminated polydiorganosiloxane P3, component A preferably contains between 20% by weight and 60% by weight, preferably between 30% by weight and 50% by weight, based on component A, of hydroxyl-terminated polydiorganosiloxane P1, and between 0.5% by weight and 15% by weight, preferably between 0.75% by weight and 10% by weight, based on component A, of hydroxyl-terminated polydiorganosiloxane P3.

The polydiorganosiloxanes P described may in any embodiment also include proportions of branches (so-called T units) that bear Si—OH groups on side chains. However, it is preferable that the polydiorganosiloxanes are predominantly linear and are formed without Si—OH— reactive side chains. However, for the described polydiorganosiloxanes P2 in particular, it may be advantageous as regards the mechanical properties of the cured composition when a small proportion of the polydiorganosiloxane units of the polydiorganosiloxane P2 consists of T units, preferably 0-10%, especially 0.01% to 5%, most preferably 0.02% to 1%, of the siloxane units of the polydiorganosiloxane P2. The remaining siloxane units are in all cases D units, i.e. strictly linear siloxane units without Si—OH groups.

Water

The component A of the two-component silicone composition further comprises between 0.05% by weight and 5.0% by weight of emulsified water, based on component A. Water in component A results in rapid, uniform curing of the mixed two-component composition and is essential in order to permit rapid and uniform curing according to the invention. Water is preferably present in an amount of between 0.1% by weight and 2.5% by weight, especially between 0.1% by weight and 1.5% by weight, based on component A.

The water is not present here in free form or as adsorbed water (for example on fillers), but is mixed in as an emulsion (for example in silicone oil). This permits more homogeneous mixing-in with low concentration gradients and, after application, more uniform curing of the mixed composition. Water/oil emulsions containing for example 40% to 60% by weight of water have proven advantageous.

Component A of the two-component silicone composition may further comprise additional additives, for example fillers, plasticizers, pigments, and formulation additives such as dispersion additives or thixotropic agents. Such additives are known to the person skilled in the art of silicone formulation. These additives can improve the processability and miscibility of component A and/or of the mixed two-component silicone composition. However, they are not essential to the effect of the invention.

Component B

The second component B of the two-component silicone composition comprises:

i) at least one noncondensable polydiorganosiloxane as plasticizer W;

ii) at least one organosilane V as crosslinker;

iii) at least one catalyst K for the crosslinking of polydiorganosiloxanes;

characterized in that all organosilanes V preferably have the same hydrolyzable alkoxysilane groups, preferably methoxysilane groups; and catalyst K is a tin complex of formula (V) that has two mercaptide ligands,

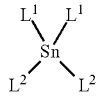

(V)

where ligands $L^1$ are each independently alkyl mercaptides coordinated via sulfur, especially $C_6$ to $C_{16}$ alkyl mercaptides, where ligands $L^1$ optionally have methyldialkoxysilane groups, preferably methyldimethoxysilane groups, and ligands $L^2$ are each independently alkyl ligands, especially $C_6$ to $C_{14}$ alkyl ligands; and component B contains less than 5% by weight of carbon black, based on component B.

Plasticizer W

Component B, and preferably also component A, contain at least one noncondensable polydiorganosiloxane as plasticizer W. This is typically a polydiorganosiloxane whose end groups have been capped with alkyl or vinyl groups and the polydiorganosiloxane accordingly cannot enter into any condensation or crosslinking reactions.

Particularly suitable plasticizers W are trialkylsilyl-terminated polydialkylsiloxanes, especially trimethylsilyl-terminated polydimethylsiloxanes, as already described further hereinabove. However, it is also possible to use trimethylsilyl-terminated polydimethylsiloxanes in which some of the methyl groups have been replaced by other organic groups, for example phenyl, vinyl or trifluoropropyl. Even though particular preference is given to using linear trimethylsilyl-terminated polydimethylsiloxanes as plasticizers W, it is also possible to use compounds that are branched. Such branched compounds result from use of small amounts of tri- or tetrafunctional silanes in the starting materials used for their preparation. Instead of the polysiloxane plasticizers, it is also possible to use as plasticizers W other organic compounds, for example particular hydrocarbons, hydroxyl-free polyethers or mixtures thereof. Hydrocarbons of this kind may be aromatic or aliphatic. When selecting, particular care should be taken to ensure that said hydrocarbons have low volatility and sufficient compatibility with the other constituents of the silicone composition.

Preference as plasticizers W is given to polydimethylsiloxanes having viscosities of between 1 and 200000 mPa·s. Particular preference is given to viscosities of between 10 and 150000 mPa·s.

It is particularly advantageous here and preferred when trialkylsilyl-terminated polydimethylsiloxanes having viscosities of between 1 and 10000 mPa s, preferably between 10 and 1000 mPa·s, are used in component A as plasticizers W. This allows component A to be set to particularly advantageous viscosities, which facilitates mixing.

It is in addition particularly advantageous and preferred when trialkylsilyl-terminated polydimethylsiloxanes having viscosities of between 10000 and 200000 mPa·s, preferably between 20000 and 150000 mPa·s, are used in component B as plasticizers W. This allows particularly good storage stability and a particularly low tendency to phase separation to be achieved in component B.

Such plasticizers W are very well known to the person skilled in the art of silicone formulation and these are sold for example under the Wacker® AK trade name series by Wacker Chemie, Germany and described in detail further hereinbelow. These nonreactive polydiorganosiloxanes are also referred to as silicone oils. They are obtainable in various chain lengths and hence viscosities, their main purpose being to make solid constituents such as fillers easy to mix in and homogenize with the other constituents and to improve the mechanical properties and flow properties of the composition.

Component B preferably contains between 30% by weight and 50% by weight of plasticizer W.

Component A preferably contains between 1% by weight and 15% by weight of plasticizer W. Component A requires less plasticizer W or none at all, since component A already contains liquid hydroxyl-terminated polydiorganosiloxanes.

It may be advantageous to combine various plasticizers W of this kind, for example having different viscosities or different end groups.

Preferably, component B contains at least one plasticizer W having vinylsilane end groups or methylsilane end groups.

Catalyst K

Component B of the two-component silicone composition further comprises at least one catalyst K for the crosslinking of polydiorganosiloxanes.

Catalyst K is a tin complex of formula (V) that has two mercaptide ligands,

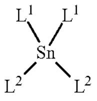

(V)

where ligands $L^1$ are each independently alkyl mercaptides coordinated via sulfur, especially $C_6$ to $C_{16}$ alkyl mercaptides, preferably $C_8$ to $C_{14}$ alkyl mercaptides, most preferably $C_{10}$ to $C_{12}$ alkyl mercaptides, where ligands $L^1$ optionally have methyldialkoxysilane groups, preferably methyldimethoxysilane groups, and ligands $L^2$ are each independently $C_3$ to $C_{18}$ alkyl ligands, especially $C_6$ to $C_{14}$ alkyl ligands, preferably $C_6$ to $C_{12}$ alkyl ligands.

Catalyst K is thus a Sn(IV) complex having two $C_3$ to $C_{18}$ alkyl ligands $L^2$, especially two $C_6$ to $C_{14}$ alkyl ligands $L^2$.

Very short alkyl ligands, such as methyl ligands, have been found to result in poor storage stability of the component B and are therefore unsuitable as ligand $L^2$.

Ligands $L^2$ are preferably $C_6$ to $C_{14}$ alkyl ligands, especially phenyl, hexyl, octyl or dodecyl ligands, most preferably octyl ligands. These form complexes that are particularly storage-stable and in the composition particularly good activity according to the invention.

In addition, catalyst K has two mercaptide ligands $L^1$ coordinated via the sulfur atoms, especially $C_6$ to $C_{16}$ alkyl mercaptides, where ligands $L^1$ optionally have methyldialkoxysilane groups, preferably methyldimethoxysilane groups. The term mercaptide is used synonymously with the term thiolate and describes deprotonated $RS^-$ ligands, where R is an organic radical.

It has been found that the two ligands $L^1$ cannot constitute a single bidentate ligand having two thiolate groups, since the chelating effect can decrease the effect according to the invention. Ligands $L^1$ must therefore be two individually coordinated alkyl mercaptide ligands. It is preferable that these ligands do not have any other heteroatoms that can be coordinated to tin, such as amino or carboxylate groups. Preferably, ligands $L^1$ contain no functional groups having heteroatoms, aside from methyldialkoxysilane groups.

Methyldialkoxysilane groups, especially methyldimethoxysilane groups, can on the other hand be advantageous since they can be incorporated into the polymer backbone, thereby limiting the mobility of the sulfur ligands. This has the advantage that undesired migration effects and/or any yellowing are prevented. However, it is preferable when the methylalkoxysilane groups, if present, have the same alkoxysilane groups as the crosslinkers V.

Furthermore, ligands $L^1$ having trialkoxysilane groups have been found to be unsuitable, since they decrease the effectiveness of the catalyst and the storage stability of the composition.

Ligands $L^1$ are preferably dodecylthiolate ligands, octadecylthiolate ligands, or 3-mercaptopropylmethyldimethoxysilane ligands coordinated via the sulfur atom.

Particular preference is given to dodecylthiolate ligands. These result in a particularly effective, particularly storage-stable catalyst K. Dodecylthio ligands have the further advantage of having a barely perceptible odor compared to ligands having shorter alkyl chains, but still being liquid at room temperature and therefore easy to handle compared to ligands having longer alkyl chains.

Particular preference is further given to 3-mercaptopropylmethyldimethoxysilane ligands coordinated via the sulfur atom. These result in a particularly effective catalyst K and a particularly low tendency to yellowing in the cured composition.

In a particularly preferred embodiment of catalyst K, in the formula (V) both ligands $L^1$ are dodecyl mercaptide and both ligands $L^2$ are octyl.

In a further particularly preferred embodiment of catalyst K, in the formula (V) both ligands $L^1$ are 3-mercaptopropylmethyldimethoxysilane and both ligands $L^2$ are octyl.

Catalysts K can be easily prepared, for example by stirring dialkyltin diacetates with the appropriate mercaptan ligands in a molar ratio (ligand:tin complex) of approximately 2:1 with exclusion of air for 24 h at 23° C. By-products formed in the process by ligand exchange, such as acetic acid, can advantageously be removed, for example by distillation under reduced pressure.

It is of course possible or in some cases even preferable to use mixtures of different catalysts.

The proportion of the catalyst K for the crosslinking of polydiorganosiloxanes is preferably 0.05% to 10% by weight, especially 0.1% to 5% by weight, preferably 0.25% to 4% by weight, based on component B of the two-component silicone composition.

The amount of catalyst K influences the pot life and the pot life range that can be established in the mixed two-component composition. The higher the catalyst content, the shorter the pot life that can be established tends to be, and the faster the subsequent curing will be. However, these effects are also highly influenced by the choice of crosslinkers. This is addressed further down.

Component B of the two-component silicone composition further contains at least one crosslinker, preferably two or more different crosslinkers, for silicone compositions. Crosslinkers refer here to organic silicon compounds having hydrolyzable alkoxysilane groups. The present invention distinguishes between three different types of crosslinker V1, V2, and V3, which are elucidated in more detail hereinbelow.

It is advantageous and preferable for the effect of the present invention when all crosslinkers in the composition bear the same alkoxysilane groups. For example, all crosslinkers may have methoxysilane groups or all crosslinkers ethoxysilane groups. Mixtures of different alkoxysilane groups are usually not advantageous and can hinder or even prevent the effect of the invention. However, it is entirely possible to use mixtures of crosslinkers having methoxy and ethoxysilane groups, for example when the crosslinker V that hydrolyzes the most slowly has ethoxysilane groups instead of methoxysilane groups and all other, faster crosslinkers V have methoxysilane groups. Likewise, when a mixture of crosslinkers V is used, crosslinkers comprising a very small proportion of the mixture can have alkoxysilane groups different than the rest of the crosslinkers, but these should then be of the same type in respect of alkoxysilane groups. The effect of the invention is not decreased in such mixtures.

Crosslinker V1

Component B of the composition of the invention contains between 0% and 50% by weight, based on component B, of at least one first organosilane V1 of formula (I)

$$(R^aO)_3\text{—Si—}R^b\text{—Si—}(OR^a)_3 \tag{I}$$

where $R^a$ is a hydrogen atom or a monovalent linear or branched alkyl radical having 1 to 6 carbon atoms, $R^b$ is a divalent linear or branched alkyl radical or alkenyl radical having 2 to 20 carbon atoms.

Preferably, $R^a$ is a hydrogen atom or a methyl or ethyl radical. Most preferably, $R^a$ is a hydrogen atom or a methyl radical.

Silanes V1 containing ethyl radicals as $R^a$, which are converted into hydrogen atoms after hydrolysis, are particularly advantageous because they firstly permit adjustment of pot life with particularly good controllability but nevertheless cure very rapidly, and additionally do not cause any toxic methanol emissions.

Silanes V1 containing methyl radicals as $R^a$, which are converted into hydrogen atoms after hydrolysis, are particularly advantageous because they cure particularly quickly after the end of the pot life and nevertheless permit long pot lives and long mixer open times.

Preferably, $R^b$ is a linear alkyl radical or alkenyl radical having 2 to 12 carbon atoms, preferably having 2 to 6 carbon atoms, most preferably an ethyl radical, a propyl radical, an ethylene radical or a propenyl radical.

Organosilane V1 is not absolutely necessary for the effect of the invention, but in combination with organosilane V2 has the advantage that, when present in the formulation, it permits better adjustability of the pot life. The use of an organosilane V1 makes it possible to increase the maximally possible pot life of the composition, but without this significantly slowing the rate of curing after the end of the pot life.

Preferred embodiments of the composition of the invention contain between 10% by weight and 30% by weight, preferably between 12% by weight and 20% by weight, of organosilane V1, based on component B.

Crosslinker V2

Component B of the composition of the invention contains between 2% and 60% by weight, based on component B, of at least one second organosilane V2 of formula (II)

$$(R^aO)_3\text{—Si—}R^c\text{—Si—}(OR^a)_3 \tag{II}$$

where $R^a$ is as defined for the organosilane V1, and $R^c$ is a divalent linear or branched alkyl radical that has 2 to 20 carbon atoms and contains at least one secondary amino group and optionally a hydroxyl group and an ether oxygen.

Preferably, organosilane V2 has a structure as described in formula (IIa)

$$(R^aO)_3\text{—Si—}R^d\text{—}\overset{H}{N}\text{—}R^e\text{—Si—}(OR^a)_3 \tag{IIa}$$

where $R^d$ is a divalent linear or branched alkyl radical that has 2 to 10 carbon atoms and optionally contains a hydroxyl group and an ether oxygen, and $R^e$ is a divalent linear or branched alkyl radical that has 2 to 10 carbon atoms and optionally contains a secondary amino group.

Preferred embodiments of the composition of the invention contain between 5% by weight and 50% by weight, preferably between 10% by weight and 45% by weight, of organosilane V2, based on component B.

In a preferred embodiment, the organosilane V2 is an organosilane V2a in which the radicals $R^d$ and $R^e$ in formula (IIa) are both a divalent linear or branched alkyl radical having 2 to 10 carbon atoms, especially a propyl radical.

In another particularly preferred embodiment, the organosilane V2 is an organosilane V2b in which radical $R^e$ in formula (IIa) is a divalent linear or branched alkyl radical having 2 to 10 carbon atoms that optionally contains a secondary amino group, especially a propyl radical or a $C_5$ alkyl radical having a secondary amino group in the carbon chain, and radical $R^d$ contains a divalent linear or branched alkyl radical having 2 to 10 carbon atoms, especially a propyl radical, and additionally contains one of the two structural elements shown in formula (IIb). Here, the NH group in formula (IIb) is the NH group in formula (IIa), and the dashed line at the oxygen atom represents the bond to the divalent linear or branched alkyl radical having 2 to 10 carbon atoms, especially the propyl radical.

(IIb)

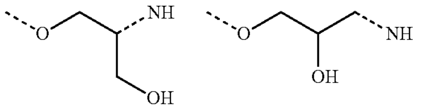

Organosilanes V2a are commercially available, for example under the Dynasylan® 1122 and Dynasylan® 1124 trade names (Evonik). Dynasylan® 1124 is bis(trimethoxysilylpropyl)amine and Dynasylan® 1122 is bis(trimethoxysilylpropyl)amine.

Organosilanes V2b can be easily prepared from commercially available organosilanes, for example from the reaction of an equimolar amount of 3-aminopropyltriethoxysilane with 3-glycidoxypropyltriethoxysilane, with exclusion of water, until the epoxy groups have reacted to completion.

In a particularly preferred embodiment of organosilane V2b, radical $R^e$ in formula (IIa) is a divalent $C_5$ alkyl radical that has a secondary amino group in the carbon chain and radical $R^d$ is a linear divalent $C_6$ alkyl radical that has an ether oxygen in the carbon chain and also has a hydroxyl group. This preferably has exclusively methoxysilane groups as alkoxysilane groups. Such an organosilane can be prepared for example from the reaction of an equimolar amount of N-(2-aminoethyl)-3-aminopropyltrimethoxysilane (for example Geniosil® GF 91, Wacker) with 3-glycidoxypropyltrimethoxysilane (for example Geniosil® GF 80, Wacker), with exclusion of water, until the epoxy groups have reacted to completion.

In preferred embodiments of the composition according to the invention, organosilane V2 comprises an organosilane V2a as previously described, organosilane V2a being present in an amount of between 5% and 20% by weight based on component B, and in addition organosilane V2 comprises an organosilane V2b as previously described, organosilane V2b being present in an amount of between 5% and 20% by weight based on component B, and the composition further comprises at least one organosilane V3 in an amount of between 2.5% and 20% by weight based on component B, and the catalyst K is present in component B in an amount of between 0.1% and 1.5% by weight based on component B.

This embodiment permits a particularly suitable, adequately long pot life and mixer open time and particularly rapid curing after the end of the pot life and particularly good storage stability, especially for component B.

In preferred embodiments of the composition of the invention, a mixture of organosilane V2a and organosilane V2b is used as organosilane V2. In these embodiments, the content of catalyst K is preferably between 0.1% by weight and 2% by weight, especially between 0.2% by weight and 1% by weight, based on component B. This permits a very precisely adjustable, user-friendly but short to average pot life and very rapid curing and is suitable in particular for automated application by machine with short cycle times, and also particularly well suited for a pot life that can be freely selected by varying mixing ratios of components A and B. This is particularly advantageous for flexible application or in complex applications where a varying pot life but always identical final properties in the cured composition is desirable.

In this embodiment, the organosilanes V2a and V2b are preferably used in the formulation in the weight ratio of between 1:2 and 2:1.

Preferred embodiments of this embodiment of the composition of the invention contain between 5% by weight and 25% by weight, preferably between 7.5% by weight and 22.5% by weight, of organosilane V2a, based on component B, and between 0% by weight and 25% by weight, preferably between 5% by weight and 22.5% by weight, of organosilane V2b, based on component B.

Crosslinker V3

Component B of the two-component silicone composition also preferably comprises between 0% and 25% by weight, based on component B, of further organosilanes V3 having hydrolyzable alkoxysilane groups Si—OR$^a$ that are not covered by the formulas (I) and (II). These likewise serve as crosslinkers, but are optional.

The additional organosilane V3 is especially a silane of the formula (III).

$$(R^3)_p\text{—Si—}(OR^4)_{4-p} \quad \text{(III)}$$

The radical $R^3$ is here each independently a linear or branched, monovalent hydrocarbyl radical that has 1 to 12 carbon atoms and optionally includes one or more heteroatoms, and optionally one or more C—C multiple bonds and/or optionally cycloaliphatic and/or aromatic components.

The radical $R^4$ is a radical $R^a$ as described further hereinabove.

The index p has a value of 0 to 4, with the proviso that, if p has a value of 3 or 4, at least p-2 radicals $R^3$ each have at least one group reactive, especially condensable, with the hydroxyl groups of the polydiorganosiloxane P, i.e. a hydroxyl group for example. In particular, p has a value of 0, 1 or 2, preferably a value of 0.

For the choice of the silane of the formula (III) as crosslinker for polydiorganosiloxanes, different demands on the two-component silicone composition may be critical. Not only does the reactivity of the silane play an important role, toxicological reasons may also be critical for the choice of crosslinker.

Examples of suitable silanes of the formula (III) are methyltrimethoxysilane, chloromethyltrimethoxysilane, ethyltrimethoxysilane, propyltrimethoxysilane, octyltrimethoxysilane, methyltriethoxysilane, phenyltriethoxysilane, methyltripropoxysilane, phenyltripropoxysilane, octyltriethoxysilane, tetramethoxysilane, tetraethoxysilane, tetra-n-propoxysilane or tetra-n-butoxysilane.

More preferably, the silane of the formula (III) is methyltrimethoxysilane, dimethyltrimethoxysilane or tetramethoxysilane or a mixture thereof, very particularly preferably methyltrimethoxysilane, octyltrimethoxysilane or mixtures thereof.

Vinyltrimethoxysilane or vinyltriethoxysilane have been found to be unsuitable as crosslinkers, since the vinyl group has a very adverse effect on the storage stability.

The use of a mixture of methyltrimethoxysilane and octyltrimethoxysilane as a crosslinker V3 allows the pot life and the mixer open time of a silicone composition according to the invention to be adjusted, a higher amount of octyltrimethoxysilane resulting in a longer pot life and mixer open time.

In addition, the silanes present in component B may also already be present in hydrolyzed form in part (some of all $R^4$═H) or in full (all $R^4$═H). The greatly enhanced reactivity of partly or fully hydrolyzed silanes means that the use thereof as crosslinkers may be advantageous. The person skilled in the art is here aware that the use of partly or fully hydrolyzed silanes can lead to the formation of oligomeric siloxanes, especially dimers and/or trimers, formed by condensation of hydrolyzed silanes. The crosslinkers used for the two-component silicone composition may accordingly also be oligomeric siloxanes. Examples of suitable oligomeric siloxanes are hexamethoxydisiloxane, hexaethoxydisiloxane, hexa-n-propoxydisiloxane, hexa-n-butoxydisiloxane, octamethoxytrisiloxane, octaethoxytrisiloxane, octa-n-butoxytrisiloxane, decamethoxytetrasiloxane, and decaethoxytetrasiloxane.

The crosslinker used for the two-component silicone composition may of course also be any desired mixture of the abovementioned silanes.

The proportion of the organosilane V3 is preferably 0.1% to 25% by weight, especially 0.5% to 20% by weight, preferably 1% to 15% by weight, based on component B of the two-component silicone composition.

The two-component silicone composition may optionally contain further constituents in one or both of components A and B.

Such additional constituents are especially plasticizers W as described further above, which are mandatory in component B, inorganic and/or organic fillers, curing accelerators, pigments, adhesion promoters, processing auxiliaries, rheology modifiers, stabilizers, dyes, inhibitors, heat stabilizers, antistats, flame retardants, biocides, waxes, leveling agents, thixotropic agents, and further standard raw materials and additives known to the person skilled in the art. When such optional constituents are used, it is important to ensure that constituents that could decrease the storage stability of the composition by reacting with one another or with other ingredients are stored separately from one another.

In addition, when selecting any of the constituents mentioned that are optionally present in the two-component silicone composition, it is advantageous when the presence of such a constituent does not adversely affect the storage stability of the two components of the two-component silicone composition, in other words that the properties of the composition, especially the application and curing properties, undergo only little or no change during storage. This means that reactions that lead to chemical curing of the described two-component silicone composition do not occur to a significant degree during storage. It is therefore especially advantageous when the constituents mentioned contain, or release during storage, no water or at most traces thereof. It may therefore be advisable for certain constituents to undergo chemical or physical drying before being mixed into the composition.

Preferably, the composition also includes at least one filler in one or both of components A and B, especially in component A. The filler influences both the rheological properties of the uncured composition and the mechanical properties and the surface characteristics of the cured composition. It is possible to use either active or passive fillers in the two-component silicone composition. In the case of active fillers, chemical or physical interactions with the polymer occur; in the case of passive fillers, these occur only to a minor degree, if at all.

Suitable fillers are inorganic and organic fillers, for example natural, ground or precipitated calcium carbonates that have optionally been coated with fatty acids, especially stearic acid, or with preferably hydrophobic silanes or siloxanes, calcined kaolins, aluminum oxides, aluminum hydroxides, silicas, especially finely divided silicas from pyrolysis processes, carbon black, especially industrially produced carbon black, which can however be used only to a limited extent in component B, aluminum silicates, magnesium aluminum silicates, zirconium silicates, quartz powder, cristobalite powder, diatomaceous earth, mica, iron oxides, titanium oxides, zirconium oxides, gypsum, annaline, barium sulfate ($BaSO_4$, also called baryte or heavy spar), boron carbide, boron nitride, graphite, carbon fibers, glass fibers or hollow glass beads, the surface of which is optionally treated with a hydrophobizing agent. Preferred fillers are calcium carbonates, calcined kaolins, carbon black, finely divided silicas, and flame-retardant fillers such as hydroxides or hydrates, especially hydroxides or hydrates of aluminum, preferably aluminum hydroxide.

In a preferred embodiment, the silicone composition contains as filler finely divided silicas from pyrolysis processes or precipitated and/or ground calcium carbonates, especially ones having a hydrophobic coating.

Component A preferably contains at least one filler, especially precipitated and/or ground, preferably hydrophobically coated, calcium carbonates.

Component B preferably contains finely divided silicas from pyrolysis processes. Component B must contain less than 5% by weight of carbon black, based on component B. Preferably, component B contains no carbon black. Carbon black hinders the effect according to the invention of the catalyst K.

It is entirely possible and may even be advantageous to use a mixture of different fillers.

A suitable amount of filler is, for example, in the range from 10% to 70% by weight, especially 15% to 60% by weight, preferably 30% to 60% by weight, based on the overall two-component silicone composition.

Particularly suitable adhesion promoters are alkoxysilanes that have preferably been substituted by functional groups. The functional group is for example an aminopropyl, glycidoxypropyl or mercaptopropyl group. Preference is given to amino-functional groups. Certain of these adhesion promoters already come under the definition of the crosslinker V3 and must accordingly be taken into account in this respect. The alkoxy groups of such silanes are usually a methoxy or ethoxy group. Particular preference is given to aminopropyltrimethoxysilane, 3-aminopropyltriethoxysilane, 3-(2-aminoethyl)aminopropyltriethoxysilane, and 3-mercaptopropyltriethoxysilane. It is also possible to use a mixture of adhesion promoters. Also additionally suitable as adhesion promoters are, for example, amino-functional alkylsilsesquioxanes such as amino-functional methylsilsesquioxane or amino-functional propylsilsesquioxane, alkoxylated alkyleneamines, especially ethoxylated and/or propoxylated alkylenediamines, and further, especially substituted, oligomers, polymers or copolymers based on polyalkylene glycols. This is however subject to the proviso that the composition contains less than 10 mol %, based on the amount of organosilane V2, of organosilanes having epoxy groups or glycidoxy groups. Preferably, the composition contains less than 5 mol %, especially less than 1 mol %, based on the amount of organosilane V2, of organosilanes having epoxy groups. The presence of organosilanes with epoxy groups in amounts above these ranges can result in the effect of the invention being significantly hindered and the composition no longer curing properly.

It is clear to the person skilled in the art that it is possible when using silanes as adhesion promoters for these to be able to be in partly or fully hydrolyzed form depending on the conditions, for example humidity. The person skilled in the art is also aware that the presence of such partly or fully hydrolyzed silanes can result in condensation reactions leading to the formation of oligomeric siloxanes, especially dimers and/or trimers.

The proportion of the adhesion promoter, which preferably does not come under the definition of crosslinker V3 or V2b, is preferably 0.1% to 15% by weight, especially 1% to 10% by weight, preferably 1% to 5% by weight, of the overall two-component silicone composition. However, in preferred embodiments, especially when using organosilanes V2 and/or crosslinkers V3 that may have an adhesion promoter effect, the composition preferably does not contain any further adhesion promoters.

It is very well known to the person skilled in the art that constituents such as those described in particular above may have not just one single function or effect ascribed thereto. Rather, it is usual for a single constituent or a single compound to have more than one function. For example, some adhesion promoters are also crosslinkers, or fillers are at the same time also rheology modifiers or the like. For example, a good adhesion-promoting effect is shown by the organosilanes V2, and to a particular extent V2b, as well as by certain crosslinkers V3.

A particularly preferred embodiment of component A of the silicone composition of the invention comprises:

- between 25% by weight and 60% by weight, preferably between 30% by weight and 50% by weight, based on component A, of the at least one hydroxyl-terminated polydiorganosiloxane P as described above;
- between 0.05% by weight and 5.0% by weight, preferably between 0.1% by weight and 2% by weight, of emulsified water, based on component A; and optionally plasticizers W, fillers, formulation additives, pigments, and further additives as described above.

Particularly preferred embodiments of this embodiment contain, as polymer P, a mixture of between 25% by weight and 50% by weight, preferably between 30% by weight and 45% by weight, based on component A, of polymer P1 as described above; and between 0% by weight and 10% by weight, preferably between 0.5% by weight and 5% by weight, based on component A, of polymer P3 as described above.

A particularly preferred embodiment of component B of the silicone composition of the invention comprises:

between 0.1% by weight and 4% by weight, preferably between 0.25% by weight and 3% by weight, based on component B, of catalyst K as described above; and between 25% by weight and 80% by weight, preferably between 50% by weight and 70% by weight, based on component B, of plasticizer W as described above; and between 0% by weight and 25% by weight, preferably between 0% by weight and 15% by weight, based on component B, of organosilane V1 as described above; and between 5% by weight and 25% by weight, preferably between 5% by weight and 20% by weight, based on component B, of organosilane V2a as described above; and between 0% by weight and 25% by weight, preferably between 1% by weight and 20% by weight, based on component B, of organosilane V2b as described above; and between 0.5% by weight and 25% by weight, preferably between 1% by weight and 20% by weight, based on component B, of organosilane V3 as described above; and optionally fillers, formulation additives, pigments, and further additives as described above.

The two-component silicone composition of the invention is typically stored in a package having two separate chambers. Component A is here present in one chamber and component B is present in the other chamber of the package.

Examples of suitable packages are double cartridges, such as twin or coaxial cartridges, or multichamber tubular pouches with adapter. Preference is given to mixing the two components A and B with the aid of a static mixer that can be fitted onto the package having two chambers.

Such suitable packages are described for example in US 2006/0155045 A1, WO 2007/096355 A1 and in US 2003/0051610 A1.

In an industrial-scale plant, the two components A and B are typically stored separately from one another in vats or hobbocks, and expressed and mixed on application, for example by means of gear pumps. The composition may here be applied to a substrate manually or in an automated process by means of robots.

More particularly, the two-component silicone composition of the invention is used such that the weight ratio of component A to component B is 1:1, especially from 3:1 to 15:1, preferably from 10:1 to 14:1.

An advantage of using components A and B in the preferred weight ratio described is that existing plants for the delivery and application of two-component silicone compositions in this manner are very widespread, and retrofitting of the plants by the user for the application of components A and B in the weight ratio of for example 1:1 would be associated with a high level of cost and inconvenience.

In the same or other preferred embodiments, the mixing ratio is controlled or set via the volume of components A and B. This is practicable and advantageous particularly in the case of automated application in which the two components are pumped individually and fed to a static or dynamic mixer. In such cases, the mixing ratio by volume of component A to component B is preferably ≥1:1, especially from 1.5:1 to 15:1, preferably from 2:1 to 10:1. In the case of automated pumping and mixing, it is in some embodiments advantageous when the proportions by volume of components A and B do not differ excessively, in order to ensure a mixture that is as homogeneous as possible. In some such embodiments, the mixing ratio by volume of component A to component B is preferably from 1.1:1 to 5:1, especially from 1.5:1 to 3:1, most preferably from 1.8:1 to 2.5:1.

Further preferably, component B does not include any crosslinkable polydiorganosiloxanes. The advantage of this is better storage stability of component B.

Especially component B of the above-described two-component silicone composition is produced and stored with exclusion of moisture. If kept apart from one another, the two components are storage-stable, meaning that they can be stored with exclusion of moisture in a suitable package or arrangement as described above over a period of several months to up to a year or longer without any change in their use properties or in their properties after curing to an extent relevant to their use. Typically, the storage stability is determined by measuring the viscosity or the reactivity over time.

In the application of the two-component silicone composition, components A and B are mixed together, for example by stirring, kneading, rolling or the like, but especially by means of a static mixer. The hydroxyl groups of the hydroxyl-terminated polydiorganosiloxane P here come into contact with the hydrolyzable groups of the crosslinker or with any already hydrolyzed groups thereof, which results in curing of the composition through condensation reactions. Upon application, contact of the silicone composition with water, especially contact of water present in component A with the crosslinkers V, can likewise promote crosslinking, since reaction of the water with the hydrolyzable groups of the crosslinker results in the formation of silanol groups, which have increased reactivity compared to the hydroxyl groups of the polydiorganosiloxane P. The curing of the two-component silicone composition takes place especially at room temperature.

As reaction products of the condensation reaction, the crosslinking of the two-component silicone composition gives rise in particular also to compounds of the formula $HO—R^a$, where $R^a$ has already been described above. Preferably, these by-products of the condensation reaction are compounds that adversely affect neither the composition nor the substrate to which the composition is applied. Most preferably, the reaction product of the formula $HO—R^a$ is a compound that volatilizes readily out of the crosslinking or the already crosslinked composition.

The invention further relates to a cured silicone composition as obtainable from an above-described two-component silicone composition by mixing component A with component B.

The invention further relates to the use of two-component silicone compositions as described above as adhesive, sealant, as coating or as casting compound. Preference is given to using the composition of the invention as adhesive.

The two-component silicone composition of the invention is especially used in a method of bonding two substrates S1 and S2, comprising the steps of a) applying a two-component silicone composition as described above to a substrate S1 and/or a substrate S2;

b) contacting substrates S1 and S2 via the applied composition within the open time of the composition;

c) curing the composition by reaction of components A and B;

wherein substrates S1 and S2 are the same or different.

Preference is also given to using the composition of the invention in a method of sealing or coating, comprising the steps of a') applying a two-component silicone composition as described above to a substrate S1 and/or between two substrates S1 and S2;

b') curing the composition by reaction of components A and B;

wherein substrates S1 and S2 are the same or different.

It is of course clear to the person skilled in the art that the two components A and B must be mixed together immediately before or during application of the two-component composition.

The two-component silicone composition of the invention preferably has a pasty consistency with structurally viscous properties. Such a composition is applied to the substrate with a suitable device, preferably in the form of a bead, which advantageously has an essentially round or triangular cross-sectional area.

A composition of the invention with good application properties has high creep resistance and short threads. This means that after application it remains in the shape applied, i.e. does not flow away, and after the application device has been pulled away forms only a very short thread, if any, so that the substrate is not contaminated.

Suitable substrates S1 and/or S2 are especially substrates selected from the group consisting of concrete, mortar, brick, tile, ceramic, gypsum, natural stone such as granite or marble, glass, glass ceramic, metal or metal alloy such as aluminum, steel, nonferrous metal, galvanized metal, wood, plastics such as PVC, polyethylene, polyamide, polymethyl (meth)acrylate, polyester, epoxy resin, paint, and varnish.

The two-component silicone composition finds use especially in industrial manufacturing, especially of vehicles and consumer articles for everyday use, and also in the construction sector, especially in civil engineering below and above ground.

Preference is given to using the two-component silicone composition in window construction and facade construction, especially in facade construction.

In addition, the invention relates to an article including an at least partly cured silicone composition as described above, said article especially being a built structure, an industrial good or a mode of transport, especially a building, or a part thereof.

An illustrative enumeration of such articles comprises houses, glass facades, windows, baths, bathrooms, kitchens, roofs, bridges, tunnels, roads, automobiles, trucks, rail vehicles, buses, ships, mirrors, panes, tanks, white goods, domestic appliances, dishwashers, washing machines, ovens, headlamps, fog lights or solar panels.

The present invention further relates to a method for adjusting the pot life in which the mechanical properties after curing of a two-component silicone composition as described above are unchanged, characterized in that the mixing ratio, based on weight, of component A to component B is selected arbitrarily in the range of component A to component B of from 1:1 to 25:1, especially from 5:1 to 20:1, preferably from 7:1 to 16:1.

With the aid of this method, it is possible to adjust the pot life of a two-component silicone composition of the invention within broad limits solely via the mixing ratio of the two components A and B. After the end of the established pot life, the composition cures unusually rapidly and very uniformly. Irrespective of the chosen mixing ratio, the end properties, especially mechanical properties, of the cured composition are largely the same. This is extremely advantageous and allows a user to establish and to vary a flexible but very precisely controllable pot life without having to change components A and B of the composition and solely by adjusting the mixing ratio, for example by altered delivery output in a pump.

Thus, an optimization of the cycle times can be maintained even under varying process conditions without having to change the silicone material.

The composition of the invention cures unusually rapidly after the end of the pot life. In preferred embodiments of the silicone composition of the invention, the ratio of pot life to freedom from tack (time until the surface of the applied silicone composition has become tack-free as a result of well-advanced curing) is $<2.5$, especially between 1.1 and 2.3, preferably between 1.2 and 2.1. This permits very efficient process control, since the composition after application cures extremely rapidly and the substrate to which the composition has been applied can be immediately processed further or transported.

By contrast, two-component silicone compositions of the prior art typically have either a very long pot life and at the same time a very long curing time, or else very rapid curing and therefor an extremely short, user-unfriendly pot life. The present invention permits establishment of long or short pot lives as required, but in all cases permits very rapid curing after application.

EXAMPLES

Working examples are presented hereinbelow, which are intended to further elucidate the described invention. The invention is of course not limited to these described working examples.

Preparation of the Silicone Compositions

The following compositions were produced:

As components A and B, the constituents listed in Tables 2 to 5 were mixed together in the specified percentages by weight in a dissolver at room temperature under an inert atmosphere, and stirred in until a macroscopically homogeneous paste was obtained.

The prepared components A and B were sealed in separate containers in an airtight manner. Upon application, components A and B were mixed in the required weight ratio using a speed mixer (Hauschild & Co. KG, Germany).

Description of the Test Methods

To measure the pot life (also open time) of the composition, components A and B were mixed together by means of a tumbling mixer in a weight ratio as specified in Tables 6 to 9 (A:B=13:1 or A:B=3:1), after first being conditioned at 23° C. in a closed cartridge for 24 hours. A wooden spatula was then introduced into the mass. The spatula was used to determine at one-minute intervals whether the mixed mass is still pasty in character. As soon as the mass shows partially elastic behavior, the pot life is considered to have been attained. Measurements with artificially aged compositions were also carried out. Before undergoing the test program mentioned above, these were first heated at 70° C. for 7 days in closed containers, the respective components A and components B being heated separately from each other in a closed manner.

The method for determining the elongation at break and the tensile strength and the production of the test specimens required for this purpose are described in ISO 527.

Measurements were carried out at 23° C. and 50% relative humidity on a type 1B test specimen (ISO 527-2) and with a strain rate of 200 mm/min.

Preparation of Crosslinker V2b

N-(2-Aminoethyl)-3-aminopropyltrimethoxysilane (Geniosil® GF 91, Wacker) was mixed with an equimolar amount of 3-glycidoxypropyltrimethoxysilane (Geniosil® GF 80, Wacker) in a glass vessel under a nitrogen atmosphere. The vessel was closed and left at 23° C. for 7 days. The resulting mixture, which was free of detectable epoxy groups, was used as organosilane V2b without workup.

Origin or Preparation of Catalysts K1 to K8

K1: Fomrez® UL-32 (Galata Chemicals)

K2: TIB KAT® 318 (TIB Chemicals)

K3: Fomrez® UL-22 (Galata Chemicals)

K4: Fomrez® UL-21 (Galata Chemicals)

K5: 0.012 mol of dioctyltin diacetate (TIB KAT® 229, TIB Chemicals) was stirred with 0.025 mol of 3-mercaptopropylmethyldimethoxysilane (Gelest) in a sealed glass vessel under a nitrogen atmosphere at 23° C. for 24 h.

K6: 0.012 mol of dioctyltin diacetate (TIB KAT® 229, TIB Chemicals) was stirred with 0.025 mol of 3-mercaptopropyltrimethoxysilane (Gelest) in a sealed glass vessel under a nitrogen atmosphere at 23° C. for 24 h.

K7: 0.012 mol of dioctyltin diacetate (TIB KAT® 229, TIB Chemicals) was stirred with 0.025 mol of octadecyl mercaptan (Aldrich) in a sealed glass vessel under a nitrogen atmosphere at 23° C. for 24 h.

K8: 0.012 mol of butyltin triacetate (TIB KAT® 220, TIB Chemicals) was stirred with 0.037 mol of dodecyl mercaptan (Aldrich) in a sealed glass vessel under a nitrogen atmosphere at 23° C. for 24 h.

TABLE 1

| Catalyst | $L^1$ | $L^1$ | $L^2$ | $L^2$ |
|---|---|---|---|---|
| K1 | 1-Dodecanethiolate | 1-Dodecanethiolate | Octyl | Octyl |
| K2 | Neodecanoate | Neodecanoate | Octyl | Octyl |
| K3 | 1-Dodecanethiolate | 1-Dodecanethiolate | Methyl | Methyl |
| K4[a] | 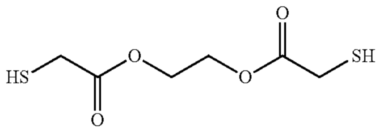 | | Octyl | Octyl |
| K5 | 3-Mercaptopropyl-methyldimethoxysilane | 3-Mercaptopropyl-methyldimethoxysilane | Octyl | Octyl |
| K6 | 3-Mercaptopropyl-trimethoxysilane | 3-Mercaptopropyl-trimethoxysilane | Octyl | Octyl |
| K7 | 1-Octadecanethiolate | 1-Octadecanethiolate | Octyl | Octyl |
| K8[b] | 1-Dodecanethiolate | 1-Dodecanethiolate | 1-Dodecane-thiolate | Butyl |

Employed catalysts K1 to K8. The columns describe the ligands $L^1$ and $L^2$ of formula (V).
All catalysts are tetracoordinate tin catalysts.
[a]Ligand $L^1$ and $L^2$ are present in the form of a bidentate dimercaptan.
[b]One of the ligands $L^2$ is identical to the two ligands $L^1$.

TABLE 2

Two-component silicone compositions 1 to 8.

| | Composition | 1 | 2 Ref | 3 Ref | 4 Ref | 5 | 6 Ref | 7 | 8 Ref |
|---|---|---|---|---|---|---|---|---|---|
| A | OH-term. PDMS [a] (viscosity (23° C.) 20 000 mPa · s) (polymer P1) | 36.7 | 36.7 | 36.7 | 36.7 | 36.7 | 36.7 | 36.7 | 36.7 |
| | OH-term. PDMS [a] (viscosity (25° C.) 34.5 mPa · s) (polymer P3) | 0.92 | 0.92 | 0.92 | 0.92 | 0.92 | 0.92 | 0.92 | 0.92 |
| | Plasticizer W (Wacker ® AK 100) [b] | 11.0 | 11.0 | 11.0 | 11.0 | 11.0 | 11.0 | 11.0 | 11.0 |
| | Polypropylene glycol dispersion additive | 1.38 | 1.38 | 1.38 | 1.38 | 1.38 | 1.38 | 1.38 | 1.38 |
| | Silicone oil in water emulsion (60% $H_2O$) | 0.46 | 0.46 | 0.46 | 0.46 | 0.46 | 0.46 | 0.46 | 0.46 |
| | Hakuenka ® CCR-S (hydrophobized precipitated chalk) | 40.4 | 40.4 | 40.4 | 40.4 | 40.4 | 40.4 | 40.4 | 40.4 |
| | Calciplast ® 4M (hydrophobized ground chalk) | 9.14 | 9.14 | 9.14 | 9.14 | 9.14 | 9.14 | 9.14 | 9.14 |

TABLE 2-continued

Two-component silicone compositions 1 to 8.

| | Composition | 1 | 2 Ref | 3 Ref | 4 Ref | 5 | 6 Ref | 7 | 8 Ref |
|---|---|---|---|---|---|---|---|---|---|
| B | Plasticizer W (Wacker ® AK 20 000) [c] | 67.5 | 67.5 | 67.5 | 67.5 | 67.5 | 67.5 | 67.5 | 67.5 |
| | Dynasylan ® 1124 (crosslinker V2a) | 5.26 | 5.26 | 5.26 | 5.26 | 5.26 | 5.26 | 5.26 | 5.26 |
| | Crosslinker V2b (see method of preparation) | 19.53 | 19.53 | 19.53 | 19.53 | 19.53 | 19.53 | 19.53 | 19.53 |
| | Wacker ® Silane M1 Trimethoxy (methyl-trimethoxysilane) (crosslinker V3) | 2.63 | 2.63 | 2.63 | 2.63 | 2.63 | 2.63 | 2.63 | 2.63 |
| | Aerosil ® R972 (hydrophobic fumed silica) | 4.25 | 4.25 | 4.25 | 4.25 | 4.25 | 4.25 | 4.25 | 4.25 |
| | Catalyst K [d] | K1 | K2 | K3 | K4 | K5 | K6 | K7 | K8 |

All values in % by weight based on the respective component A or B;
[a] OH-term. PDMS: OH-terminated polydimethylsiloxane;
[b] Wacker Polymer AK 100: Trialkylsilane-terminated polydimethylsiloxane having a viscosity according to DIN 53018 of 100 mPa · s;
[c] Wacker silicone oil AK 20 000: Trialkylsilane-terminated polydimethylsiloxane having a viscosity according to DIN 53018 of 20 000 mPa · s;
[d] In each case 0.82% by weight of catalyst K, based on component B, was used.

TABLE 3

Two-component silicone compositions 9 to 16.

| | Composition | 9 | 10 | 11 | 12 | 13 | 14 | 15 | 16 |
|---|---|---|---|---|---|---|---|---|---|
| A | OH-term. PDMS [a] (viscosity (23° C.) 20 000 mPa · s) (polymer P1) | 36.7 | 36.7 | 36.7 | 36.7 | 36.7 | 36.7 | 36.7 | 36.7 |
| | OH-term. PDMS [a] (viscosity (25° C.) 34.5 mPa · s) (polymer P3) | 0.92 | 0.92 | 0.92 | 0.92 | 0.92 | 0.92 | 0.92 | 0.92 |
| | Plasticizer W (Wacker ® AK 100) [b] | 11.0 | 11.0 | 11.0 | 11.0 | 11.0 | 11.0 | 11.0 | 11.0 |
| | Polypropylene glycol dispersion additive | 1.38 | 1.38 | 1.38 | 1.38 | 1.38 | 1.38 | 1.38 | 1.38 |
| | Silicone oil in water emulsion (60% $H_2O$) | 0.46 | 0.46 | 0.46 | 0.46 | 0.46 | 0.46 | 0.46 | 0.46 |
| | Hakuenka ® CCR-S (hydrophobized precipitated chalk) | 40.4 | 40.4 | 40.4 | 40.4 | 40.4 | 40.4 | 40.4 | 40.4 |
| | Calciplast ® 4M (hydrophobized ground chalk) | 9.14 | 9.14 | 9.14 | 9.14 | 9.14 | 9.14 | 9.14 | 9.14 |
| B | Plasticizer W (Wacker ® AK 20 000) [c] | 67.5 | 67.5 | 67.5 | 67.5 | 67.5 | 67.5 | 67.5 | 67.5 |
| | Dynasylan ® 1124 (crosslinker V2a) | 16.9 | 12.4 | 7.9 | 5.3 | 5.26 | 5.26 | 5.26 | 5.26 |
| | Crosslinker V2b (see method of preparation) | 7.9 | 12.4 | 16.9 | 19.5 | 16.9 | 14.3 | 6.37 | 0 |
| | Wacker ® Silane M1 Trimethoxy (methyl-trimethoxysilane) (crosslinker V3) | 2.63 | 2.63 | 2.63 | 2.63 | 5.27 | 7.87 | 15.8 | 22.17 |
| | Aerosil ® R972 (hydrophobic fumed silica) | 4.25 | 4.25 | 4.25 | 4.25 | 4.25 | 4.25 | 4.25 | 4.25 |
| | Catalyst K1 [d] | 0.82 | 0.82 | 0.82 | 0.82 | 0.82 | 0.82 | 0.82 | 0.82 |

All values in % by weight based on the respective component A or B;
[a] OH-term. PDMS: OH-terminated polydimethylsiloxane;
[b] Wacker Polymer AK 100: Trialkylsilane-terminated polydimethylsiloxane having a viscosity according to DIN 53018 of 100 000 mPa · s;
[c] Wacker silicone oil AK 20 000: Trialkylsilane-terminated polydimethylsiloxane having a viscosity according to DIN 53018 of 20 000 mPa · s;
[d] Bis(dodecylthio)dioctylstannane.

TABLE 4

Two-component silicone compositions 17 to 24.

| | Composition | 17 | 18 | 19 | 20 | 21 | 22 | 23 | 24 |
|---|---|---|---|---|---|---|---|---|---|
| A | OH-term. PDMS [a] (viscosity (23° C.) 20 000 mPa · s) (polymer P1) | 36.7 | 36.7 | 36.7 | 36.7 | 36.7 | 36.7 | 36.7 | 36.7 |
| | OH-term. PDMS [a] (viscosity (25° C.) 34.5 mPa · s) (polymer P3) | 0.92 | 0.92 | 0.92 | 0.92 | 0.92 | 0.92 | 0.92 | 0.92 |
| | Plasticizer W (Wacker ® AK 100) [b] | 11.0 | 11.0 | 11.0 | 11.0 | 11.0 | 11.0 | 11.0 | 11.28 |
| | Polypropylene glycol dispersion additive | 1.38 | 1.38 | 1.38 | 1.38 | 1.38 | 1.38 | 1.38 | 1.38 |
| | Silicone oil in water emulsion (60% $H_2O$) | 0.46 | 0.46 | 0.46 | 0.46 | 0.46 | 0.46 | 0.46 | 0.18 |
| | Hakuenka ® CCR-S (hydrophobized precipitated chalk) | 40.4 | 40.4 | 40.4 | 40.4 | 40.4 | 40.4 | 40.4 | 40.4 |
| | Calciplast ® 4M (hydrophobized ground chalk) | 9.14 | 9.14 | 9.14 | 9.14 | 9.14 | 9.14 | 9.14 | 9.14 |
| B | Plasticizer W (Wacker ® AK 20 000) [c] | 67.5 | 67.5 | 67.5 | 67.5 | 67.5 | 67.5 | 67.5 | 67.5 |
| | Dynasylan ® 1124 (crosslinker V2a) | 5.3 | 5.26 | 5.26 | 5.26 | 5.15 | 5.27 | 5.26 | 5.26 |
| | Crosslinker V2b (see method of preparation) | 19.5 | 16.9 | 16.9 | 16.9 | 16.3 | 17.3 | 16.9 | 16.9 |
| | Methyltrimethoxysilane (crosslinker V3) | 0 | 4.9 | 1.74 | 0.87 | 5.16 | 5.27 | 0 | 5.26 |
| | Octyltrimethoxysilane (crosslinker V3) | 2.62 | 0.36 | 3.52 | 4.39 | 0 | 0 | 0 | 0 |
| | Phenyltrimethoxysilane (crosslinker V3) | 0 | 0 | 0 | 0 | 0 | 0 | 5.26 | 0 |
| | Aerosil ® R972 (hydrophobically fumed silica) | 4.26 | 4.26 | 4.26 | 4.26 | 4.26 | 4.26 | 4.26 | 4.26 |
| | Catalyst K1 [d] | 0.82 | 0.82 | 0.82 | 0.82 | 1.63 | 0.40 | 0.82 | 0.82 |

All values in % by weight based on the respective component A or B;
[a] OH-term. PDMS: OH-terminated polydimethylsiloxane;
[b] Wacker Polymer AK 100: Trialkylsilane-terminated polydimethylsiloxane having a viscosity according to DIN 53018 of 100 mPa · s;
[c] Wacker silicone oil AK 20 000: Trialkylsilane-terminated polydimethylsiloxane having a viscosity according to DIN 53018 of 20 000 mPa · s;
[d] Bis(dodecylthio)dioctylstannane.

TABLE 5

Two-component silicone compositions 25 and 26.

| | Composition | 25 | 26 |
|---|---|---|---|
| A | OH-term. PDMS [a] (viscosity (23° C.) 20 000 mPa · s) (polymer P1) | 34.2 | 34.2 |
| | Plasticizer W (Wacker ® AK 100) [b] | 8.5 | 8.5 |
| | Polypropylene glycol dispersion additive | 1.1 | 1.1 |
| | Silicone oil in water emulsion (60% $H_2O$) | 0.40 | 0.40 |
| | Hakuenka ® CCR-S (hydrophobized precipitated chalk) | 19.7 | 19.7 |
| | Calciplast ® 4M (hydrophobized ground chalk) | 35.5 | 35.5 |
| B | Plasticizer W (Wacker ® AK 20 000) [c] | 64.19 | 64.01 |
| | Methyltrimethoxysilane (crosslinker V3) | 11.7 | 11.64 |
| | Crosslinker V2b (see method of preparation) | 15.12 | 15.08 |
| | Dynasylan ® 1189 (N-(n-butyl)-3-aminopropyltrimethoxysilane) (crosslinker V3) | 0 | 3.33 |
| | Silauest ® A-Link 15 (N-ethyl-3-trimethoxysilyl-2-methylpropanamine) (crosslinker V3) | 3.33 | 0 |
| | *TABLE 5-continued – Two-component silicone compositions 25 and 26.* | | |
| | Aerosil ® R972 (hydrophobically fumed silica) | 5.3 | 5.3 |
| | Catalyst K1 [a] | 0.82 | 0.82 |

All values in % by weight based on the respective component A or B;
[a] OH-term. PDMS: OH-terminated polydimethylsiloxane;
[b] Wacker Polymer AK 100: Trialkylsilane-terminated polydimethylsiloxane having a viscosity according to DIN 53018 of 100 mPa · s;
[c] Wacker silicone oil AK 20 000: Trialkylsilane-terminated polydimethylsiloxane having a viscosity according to DIN 53018 of 20 000 mPa · s;
[d] Bis(dodecylthio)dioctylstannane

TABLE 6

Test data for compositions 1 to 6 and 25 to 26.

| Composition | 1 | 2 Ref. | 3 Ref. | 4 Ref. | 5 | 6 Ref. | 25 | 26 |
|---|---|---|---|---|---|---|---|---|
| Pot life 13:1 (w/w) [min] | 26 | 3 | 6 | >180 | 31 | 17 | 25 | 30 |
| Pot life 3:1 (w/w) [min] | 11 | <1 | 7 | n/a | 16 | 13 | 22 | 21 |
| Pot life (a)* 13:1 (w/w) [min] | 28 | n/m | 5 | n/m | 40 | 30 | n/m | n/m |

TABLE 6-continued

Test data for compositions 1 to 6 and 25 to 26.

| Composition | 1 | 2 Ref. | 3 Ref. | 4 Ref. | 5 | 6 Ref. | 25 | 26 |
|---|---|---|---|---|---|---|---|---|
| Pot life (a)* 3:1 (w/w) [min] | 11.3 | n/m | 2.5 | n/m | 19 | 5.8 | n/m | n/m |

(a)*: Components A and B of these samples were aged beforehand in an oven at 70° C. for 7 d.

n/m: Data were not measured.

n/a: Not cured.

TABLE 7

Test data for compositions 7 to 12.

| Composition | 7 | 8 Ref. | 9 | 10 | 11 | 12 |
|---|---|---|---|---|---|---|
| Pot life 13:1 (w/w) [min] | 22 | >270 | 7 | 11 | 35 | 36 |
| Pot life 3:1 (w/w) [min] | 7.6 | >270 | 4.25 | 7 | 17.5 | 11 |
| Pot life (a)* 13:1 (w/w) [min] | 19 | n/m | 7 | 12 | n/m | n/m |
| Pot life (a)* 3:1 (w/w) [min] | 4.3 | n/m | 4.25 | 7.3 | n/m | n/m |
| Tensile strength 5 h [MPa] | n/m | n/m | 1.66 | 1.59 | 1.12 | 1.2 |
| Tensile strength 24 h [MPa] | n/m | n/m | 1.65 | 1.68 | 1.47 | 1.43 |
| Tensile strength 7 d [MPa] | n/m | n/m | 1.59 | 1.7 | 1.67 | 1.29 |
| Tensile strength (a)* 7 d [MPa] | n/m | n/m | 1.52 | 1.58 | n/m | n/m |

(a)*: Components A and B of these samples were aged beforehand in an oven at 70° C. for 7 d.
n/m: Data were not measured.

TABLE 8

Test data for compositions 13 to 18.

| Composition | 13 | 14 | 15 | 16 | 17 | 18 |
|---|---|---|---|---|---|---|
| Pot life 13:1 (w/w) [min] | 31 | 30 | 20 | 15.5 | 50 | 30 |
| Pot life 3:1 (w/w) [min] | 10 | 9.9 | 6 | 4 | 13.5 | 10 |
| Pot life (a)* 13:1 (w/w) [min] | 38 | n/m | n/m | n/m | n/m | 34 |
| Pot life (a)* 3:1 (w/w) [min] | 12 | n/m | n/m | n/m | n/m | 12 |
| Tensile strength 5 h [MPa] | 1.61 | 1.76 | 1.38 | 1.45 | 0.6 | n/m |
| Tensile strength 24 h [MPa] | 1.69 | 1.66 | 1.55 | 1.51 | 1.53 | n/m |
| Tensile strength 7 d [MPa] | 1.69 | 1.77 | 1.72 | 1.48 | 1.69 | 1.81 |
| Tensile strength (a)* 7 d [MPa] | 1.7 | 1.64 | n/m | n/m | 1.64 | 1.78 |

(a)*: Components A and B of these samples were aged beforehand in an oven at 70° C. for 7 d.
n/m: Data were not measured.

TABLE 9

Test data for compositions 19 to 24.

| Composition | 19 | 20 | 21 | 22 | 23 | 24 |
|---|---|---|---|---|---|---|
| Pot life 13:1 (w/w) [min] | 52 | 50 | 16 | 40 | 12.5 | 31 |
| Pot life 3:1 (w/w) [min] | 9.5 | 10 | 10.3 | 9 | 6 | 9.75 |
| Pot life (a)* 13:1 (w/w) [min] | 51 | 51 | 21 | n/m | 15 | n/m |
| Pot life (a)* 3:1 (w/w) [min] | 10 | 10.5 | 8.75 | n/m | 6.3 | n/m |
| Tensile strength 5 h [MPa] | 0.76 | 0.5 | 1.73 | 0.85 | 1.64 | 1.64 |
| Tensile strength 24 h [MPa] | 1.54 | 1.69 | 1.84 | 1.56 | 1.58 | 1.65 |
| Tensile strength 7 d [MPa] | 1.68 | 1.87 | 1.73 | 1.65 | 1.51 | 1.68 |

TABLE 9-continued

Test data for compositions 19 to 24.

| Composition | 19 | 20 | 21 | 22 | 23 | 24 |
|---|---|---|---|---|---|---|
| Tensile strength (a)* 7 d [MPa] | 1.57 | 1.68 | 1.79 | n/m | 1.5 | n/m |

(a)*: Components A and B of these samples were aged beforehand in an oven at 70° C. for 7 d.
n/m: Data were not measured.

The invention claimed is:

1. A two-component silicone composition consisting of a component A comprising i) at least one hydroxyl-terminated polydiorganosiloxane P;

ii) optionally at least one filler;

iii) between 0.05% and 5.0% by weight of emulsified water, based on component A;

and a component B comprising i) at least one noncondensable polydiorganosiloxane W as plasticizer;

ii) at least one organosilane V as crosslinker;

iii at least one catalyst K for the crosslinking of polydiorganosiloxanes;

wherein catalyst K is a tin complex of formula (V) that has two mercaptide ligands, (V)

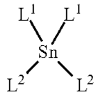

where ligands $L^1$ are each independently alkyl mercaptides coordinated via sulfur, where ligands $L^1$ optionally have methyldialkoxysilane groups, and ligands $L^2$ are each independently alkyl ligands; and component B contains less than 5% by weight of carbon black, based on component B.

2. The two-component silicone composition as claimed in claim 1, wherein the hydroxyl-terminated polydiorganosiloxane P is a polydiorganosiloxane P' of formula (I)

(I)

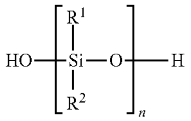

where the radicals $R^1$ and $R^2$ are each independently linear or branched, monovalent hydrocarbyl radicals that have 1 to 12 carbon atoms and optionally include one or more heteroatoms, and optionally one or more C—C multiple bonds and/or optionally cycloaliphatic and/or aromatic components; and n is chosen such that a weight-average molecular weight $M_w$ of the polydiorganosiloxane P' relative to polystyrene is 500 to 250 000 g/mol.

3. The two-component silicone composition as claimed in claim 2, wherein the hydroxyl-terminated polydiorganosiloxane P' is a polydiorganosiloxane P1 of the formula (I), where n is chosen such that the weight-average molecular weight $M_w$ of the polydiorganosiloxane P1 relative to polystyrene is 30 000 to 80 000 g/mol; or in that the polydiorganosiloxane P' used is a mixture of i') at least one hydroxyl-terminated polydiorganosiloxane P2 of the formula (I), where n is chosen such that the weight-average molecular weight $M_w$ of the polydiorganosiloxane P2 relative to polystyrene is >80 000 to 250 000 g/mol; and ii') at least one hydroxyl-terminated polydiorganosiloxane P3 of the formula (I), where n is chosen such that the weight-average molecular weight $M_w$ of the polydiorganosiloxane P3 relative to polystyrene is 500 to ≤30 000 g/mol;

or in that the polydiorganosiloxane P' used is a mixture of i") at least one hydroxyl-terminated polydiorganosiloxane P1 of the formula (I), where n is chosen such that the weight-average molecular weight $M_w$ of the polydiorganosiloxane P1 relative to polystyrene is 30 000 to 80 000 g/mol; and ii") at least one hydroxyl-terminated polydiorganosiloxane P3 of the formula (I), where n is chosen such that the weight-average molecular weight $M_w$ of the polydiorganosiloxane P3 relative to polystyrene is 500 to ≤30 000 g/mol.

4. The two-component silicone composition as claimed in claim 2, wherein the radicals $R^1$ and $R^2$ are alkyl radicals having 1 to 5 carbon atoms.

5. The two-component silicone composition as claimed in claim 1, wherein organosilane V contains between 0% and 50% by weight, based on component B, of at least one first organosilane V1 of formula (I); and $$(R^aO)_3\!-\!Si\!-\!R^b\!-\!Si\!-\!(OR^a)_3 \qquad (I)$$

Contains between 2% and 60% by weight, based on component B, of at least one second organosilane V2 of formula (II);

$$(R^aO)_3\!-\!Si\!-\!R^c\!-\!Si\!-\!(OR^a)_3 \qquad (II)$$

and contains up to 25% by weight, based on component B, of further organosilanes V3 having hydrolyzable alkoxysilane groups Si-$OR^a$ that are not covered by the formulas (I) and (II);

where $R^a$ is a hydrogen atom or an ethyl group or a methyl group;

$R^b$ is a divalent linear or branched alkyl radical or alkenyl radical having 2 to 20 carbon atoms, and $R^c$ is a divalent linear or branched alkyl radical that has 2 to 20 carbon atoms and contains at least one secondary amino group;

with a proviso that the composition contains less than 10 mol %, based on an amount of organosilane V2, of organosilanes having epoxy groups.

6. The two-component silicone composition as claimed in claim 5, wherein organosilane V3 comprises at least one silane of the formula (III), $$(R^3)_p\!-\!Si\!-\!(OR^4)_{4-p} \qquad (III)$$

where the radical $R^3$ is each independently a linear or branched, monovalent hydrocarbyl radical that has 1 to 12 carbon atoms and optionally includes one or more heteroatoms, and optionally one or more C—C multiple bonds and/or optionally cycloaliphatic and/or aromatic components;

the radical $R^4$ is a radical $R^a$; and p has a value of 0 to 4, with the proviso that, if p has a value of 3 or 4, at least p−2 radicals $R^3$ each have at least one group reactive with a hydroxyl groups of the polydiorganosiloxane P.

7. The two-component silicone composition as claimed in claim 5, wherein the organosilane V2 comprises at least one organosilane of formula (IIa), $$(R^aO)_3\!-\!Si\!-\!R^d\!-\!\overset{H}{N}\!-\!R^e\!-\!Si\!-\!(OR^a)_3 \qquad (IIa)$$

where $R^d$ is a divalent linear or branched alkyl radical that has 2 to 10 carbon atoms and optionally contains a hydroxyl group and an ether oxygen, and $R^e$ is a divalent linear or branched alkyl radical that has 2 to 10 carbon atoms and optionally contains a secondary amino group.

8. The two-component silicone composition as claimed in claim 7, wherein the organosilane V2 is either an organosilane V2a in which the radicals $R^d$ and $R^e$ in formula (IIa) are both a divalent linear or branched alkyl radical having 2 to 10 carbon atoms; or an organosilane V2b in which radical $R^e$ in formula (IIa) is a divalent linear or branched alkyl radical having 2 to 10 carbon atoms that optionally contains a secondary amino group, and radical $R^d$ contains a divalent linear or branched alkyl radical having 2 to 10 carbon atoms, and additionally contains one of two structural elements shown in formula (IIb);

(IIb)

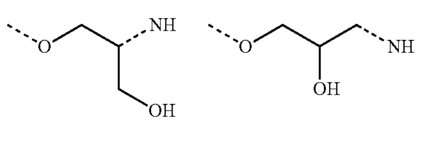

or are a mixture of an organosilane V2a and an organosilane V2b, where the organosilanes V2a and V2b mentioned are present in component B in a weight ratio of between 1:2 and 2:1.

9. The two-component silicone composition as claimed in claim 8, wherein organosilane V2 comprises an organosilane V2a, organosilane V2a being present in an amount of between 5% and 20% by weight based on component B, and organosilane V2 comprises an organosilane V2b, organosilane V2b being present in an amount of between 5% and 20% by weight based on component B, and in that at least one organosilane V3 is present in an amount of between 2.5% and 20% by weight based on component B, and in that the catalyst K is present in component B in an amount of between 0.1% and 1.5% by weight based on component B.

10. The two-component silicone composition as claimed in claim 7, wherein organosilane V2b is a radical $R^e$ a divalent $C_5$ alkyl radical that has a secondary amino group in the carbon chain and radical $R^d$ is a linear divalent $C_6$ alkyl radical that has an ether oxygen in the carbon chain and also has a hydroxyl group.

11. The two-component silicone composition as claimed in claim 1, wherein, in the catalyst K of the formula (V), both ligands L' are dodecyl mercaptide and both ligands $L^2$ are octyl.

12. The two-component silicone composition as claimed in claim 1, wherein a weight ratio of component A to component B is ≥1:1.

13. A two-part adhesive, sealant, coating or casting compound comprising the two-component silicone composition as claimed in claim 1.

14. The two-part adhesive, sealant, coating or casting compound as claimed in claim 13, configured for use in window construction or facade construction.

* * * * *